United States Patent [19]

Yamamoto et al.

[11] Patent Number: 4,566,418
[45] Date of Patent: Jan. 28, 1986

[54] ELECTRONICALLY CONTROLLED INTERNAL COMBUSTION ENGINE PROVIDED WITH AN ACCELERATOR POSITION SENSOR

[75] Inventors: Minato Yamamoto; Shunji Takahashi, both of Chigasaki, Japan

[73] Assignee: Mikuni Kogyo Kabushiki Kaisha, Tokyo, Japan

[21] Appl. No.: 645,766

[22] Filed: Aug. 30, 1984

[30] Foreign Application Priority Data

Aug. 30, 1983 [JP] Japan .................................. 58-158872
Aug. 30, 1983 [JP] Japan .................................. 58-158874

[51] Int. Cl.$^4$ ............................................ F02D 41/22
[52] U.S. Cl. ...................................... 123/479; 123/399; 364/571
[58] Field of Search ......................... 123/479, 399, 478; 364/571, 431.12, 431.06

[56] References Cited

U.S. PATENT DOCUMENTS

| 3,948,228 | 4/1976 | Luchaco | 123/479 |
| 4,310,889 | 1/1982 | Imai et al. | 123/479 |
| 4,424,785 | 1/1984 | Ishida et al. | 123/479 |
| 4,490,804 | 12/1984 | Martinsons | 123/479 |

FOREIGN PATENT DOCUMENTS 0144651 8/1983 Japan .................................. 123/479

Primary Examiner—Raymond A. Nelli
Attorney, Agent, or Firm—Lalos, Keegan, Marsh, Bentzen & Kaye

[57] ABSTRACT

An electronically controlled internal combustion engine provided with an accelerator position sensor wherein, in order to positively prevent violent running and make some degree of running possible, an idling switch, intermediate switch and fully opening switch issuing signals when a wiper crosses them are provided within the accelerator position sensor, in case the magnitude of the output from the accelerator position sensor when any of the above mentioned respective switches issues signal during the operation of the accelerator position sensor is not in a normal range memorized in advance, the accelerator position sensor will be judged to fail and, when the accelerator position sensor is judged to fail, signals from the accelerator position sensor will not be accepted, a desirable running state will be judged on the basis of a combination of the signals from the respective switched and an injector will be controlled.

3 Claims, 3 Drawing Figures

– 1 –

ELECTRONICALLY CONTROLLED INTERNAL COMBUSTION ENGINE PROVIDED WITH AN ACCELERATOR POSITION SENSOR

BACKGROUND OF THE INVENTION (a) Field of the Invention

This invention relates to an electronically controlled internal combustion engine provided with an accelerator position sensor.

(b) Description of the Prior Art

An accelerator position sensor used in an electronically controlled internal combustion engine wherein an accelerator pedal and throttle valve are electrically interlocked with each other through a computer is likely to fail due to corrosion or vibration. Therefore, in this kind of internal combustion engine, there has been a problem that, when the accelerator pedal is pressed without the knowledge of a failure of the accelerator position sensor, as a result, a violent running state will be made or running will become impossible.

SUMMARY OF THE INVENTION

In view of the above mentioned circumstances, a primary object of the present invention is to provide an electronically controlled internal combustion engine wherein, even when the accelerator position sensor fails, violent running will be positively prevented and some degree of running will be made possible.

According to the present invention, this object is attained by providing an idling switch, intermediate switch and fully opening switch provided respectively within an accelerator position sensor and respectively issuing signals when an electrical contact wiper of the accelerator position sensor crosses on them, a first means connected to the accelerator position sensor and above mentioned respective switches, memorizing in advance the normal range of respective outputs to be issued from the accelerator position sensor when the respective switches issue respective signals, judging as a failure in case the output from the accelerator position sensor when any of the respective switches issues a signal is not within the normal range and putting out a failure sensing signal, and a second means connected to the accelerator position sensor and above mentioned respective switches, not accepting signals from the accelerator position sensor when the accelerator position sensor is judged to fail, judging a desirable running state on the basis of a combination of signals from the above mentioned respective switches and controlling an injector so that the desirable running state may be obtained.

According to the present electronically controlled internal combustion engine, not only the failure of the accelerator position sensor can be quickly discovered but also, even when the accelerator position sensor fails, violent running will be positively prevented and some degree of running will be made possible.

According to a preferred formation of the present invention, when the accelerator position sensor is judged to fail by the first means, this fact will be indicated by an indicator.

DESCRIPTION OF THE PREFERRED EMBODIMENT

Figure 1:
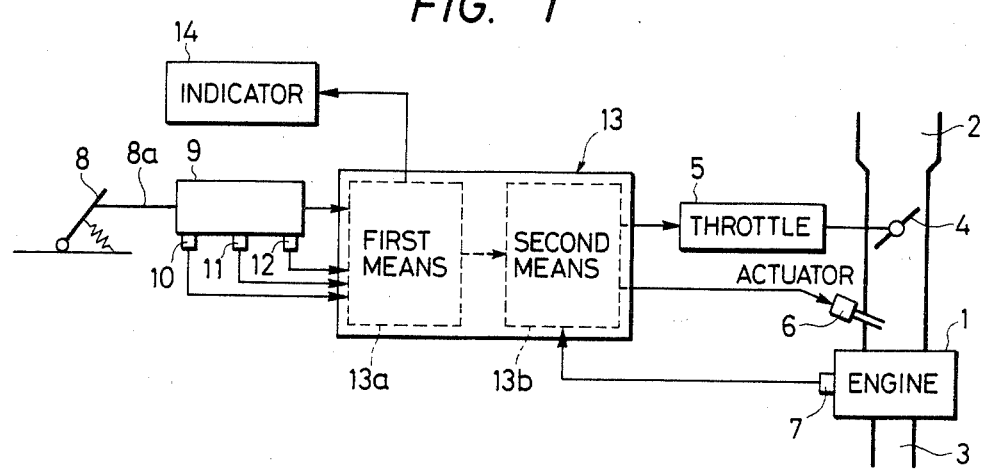
FIG. 1 is an explanatory view of an embodiment of an electronically controlled internal combustion engine provided with an accelerator position sensor according to the present invention.
Figure 2:
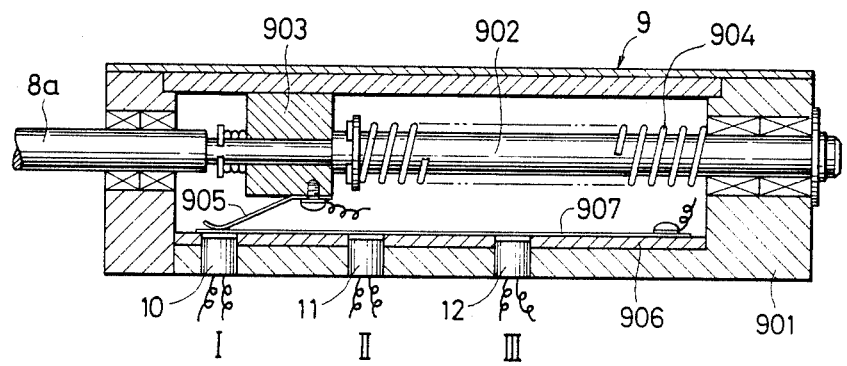
FIG. 2 is a sectioned view showing a structural example of the accelerator position sensor to be used in FIG. 1.

Referring to FIGS. 1 and 2, the reference numeral 1 denotes an engine body, 2 denotes a suction bore, 3 denotes an exhaust pipe, 4 denotes a throttle valve driven by a throttle actuator 5, 6 denotes an injector, 7 denotes a rotation sensor, 8 denotes an accelerator pedal, 9 denotes an accelerator position sensor connected to the accelerator pedal 8 through a connecting means 8a, numerals 10, 11 and 12 denote respectively an idling switch, intermediate switch and fully opening switch (see FIG. 2) provided respectively in an idling position I, intermediate position II and fully opened position III within the accelerator position sensor 9. For example, it becomes ON when an electrical contact wiper 905 of the sensor 9 crosses them from the left and becoming OFF when it crosses them from the right. Thirteen (13) denotes a computer including a first means 13a usually controlling the injector 6 in response to signals from the accelerator position sensor 9, memorizing in advance the normal range of the outputs of the accelerator position sensor 9 when the idling switch 10, intermediate switch 11 and fully opening switch 12 are made ON or OFF, that is, when the inherent signals are issued, judging the accelerator position sensor 9 to fail in case the output of the accelerator position sensor 9 when any of the above mentioned switches issues a signal is not within the normal range and putting out a failure sensing signal. A second means 13b not accepting output signals from the accelerator position sensor 9 when the accelerator position sensor 9 is judging to fail is provided. It judges a desired running state from a combination of ON and OFF-signals from the above mentioned respective switches 10, 11 and 12, further considering signals from the rotation sensor 7 and controlling the injector 6 so that the judged running state may be obtained. Fourteen (14) denotes an indicator receiving the failure sensing signal from the first means 13a and indicating that the accelerator position sensor 9 has failed.

FIG. 2 shows a structural example of the accelerator position sensor 9. The reference numeral 901 denotes a body frame, 902 denotes a rod slidably inserted in one end part through the body from 901 and in the other end part through a receiving base 903 slidably fitted within the body frame 901, numeral 904 denotes a spring wound on the rod 902 and biasing the rod 902 leftward in the position in FIG. 2, 905 denotes the above mentioned wiper fitted on the receiving base 903 as electrically insulated, 906 denotes a resistance base plate secured on the inner wall surface of the body frame 901 so as to be opposed to the wiper 905. Number 907 denotes a resistance body provided on the resistance base plate 906 and slidably contacting the wiper 905. By the way, the rod 902 is connected to the connecting means 8a.

Figure 3:
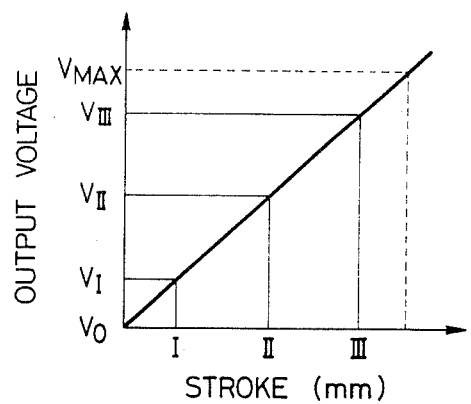
FIG. 3 is a characteristics diagram showing the relations between the stroke and output voltage in the accelerator position sensor.

FIG. 3 shows output characteristics of the accelerator position sensor 9. That is to say, generally, in the accelerator position sensor, the output voltage varies linearly with the variation of the stroke, that is, with the displacement of the wiper 905. Therefore, the normal range of the outputs of the accelerator position sensor 9 will be memorized as the outputs being $V_I$, when the wiper 905 crosses the idling switch 10, $V_{II}$ when it crosses the intermediate switch 11 and $V_{III}$ when it crosses the fully opening switch 12. When the magnitude of the output voltage in any of these positions is larger or smaller than the above mentioned value over a predetermined range, the accelerator position sensor will be judged to fail.

The operation of the above mentioned device shall be explained in the following.

When the accelerator position sensor 9 is operating normally, if the accelerator 8 is pressed down, the rod 902 will move toward the right in FIG. 2 while compressing the spring 904 through the connecting means 8a. Therefore, the wiper 905 will also move and an output voltage (output signal) in proportion to its displacement will be put into the computer 13 from the accelerator position sensor 9. Meanwhile, the computer 13 will confirm that the output voltage from the accelerator position sensor 9 is within the normal range on the basis of the signals from the idling switch 10, intermediate switch 11 and fully opening switch 12, will consider also the output from the rotation sensor 7, and will control the injector 6 and throttle actuator 5 to feed the engine 1 with a gaseous mixture of an air-fuel ratio in response to the amount the accelerator pedal 8 is depressed. When the accelerator pedal 8 is released, the connecting means 8a and rod 902 will move leftward due to the extending force of the spring 904 and the wiper 905 will return to the illustrated position.

In case the accelerator position sensor 9 is not operating normally, the first means 13a of the computer 13 will put out a failure sensing signal, as mentioned above, to the indicator 14 to indicate the fact and will put out the failure sensing signal also to the second means 13b. Therefore, after that moment, the second means 13b will not accept signals from the accelerator position sensor 9, will judge a desired running state from a combination of the ON and OFF-signal of the idling switch 10, intermediate switch 11 and fully opening switch 12, that is, from whether the wiper 905 is being slid rightward or leftward, will further consider also the signal from the rotation sensor 7 and will control the injector 6. For example, when all of the switches 10, 11 and 12 are OFF, an idling operation will be judged to be desired. In case the number of revolutions of the engine 1 detected by the rotation sensor 7 is high, a signal decreasing the fuel injection amount will be put out to the injector 6. In case the number of revolutions is low, a signal increasing the fuel injection amount will be put out to the injector 6 and a signal will be put out to the throttle actuator 5 so that an opening degree of the throttle valve 4 matching the determined fuel injection amount may be obtained. When only the idling switch 10 is ON, a low speed running will be judged to be desired and injector pulses of a comparatively small fixed width will be put out to the injector 6. When both the idling switch 10 and intermediate switch 11 are ON, high speed running will be judged to be desired and injector pulses of a fixed width somewhat larger than at the time of the low speed running will be put out to the injector 6. When all of the switches 10, 11 and 12 are ON, a fully opened running will be judged to be desired and a fully opened fuel valve signal matching the number of revolutions of the engine detected by the rotation sensor 7 will be put out to the injector 6. Thus, though the fuel control can not help being somewhat rugged, violent running will be positively prevented and some degree of running will become possible.

By the way, in the above mentioned embodiment, the accelerator position sensor provided with the resistance body and a wiper slidably contacting the resistance body is used. However, instead, an accelerator position sensor of non-contact type may be used. Further, it is needless to say that, as different from the above mentioned embodiment, the failure of the accelerator position sensor 9 may be sensed by any other failure sensing device.

What is claimed is:

1. An electronically controlled internal combustion engine comprising an accelerator position sensor provided with an electrical contact wiper operatively connected to an accelerator pedal, an idling switch for indicating the position of said pedal at which a throttle valve is opened to the idling position, an intermediate switch for indicating the position of said pedal at which the throttle valve is opened to the middle position a fully opening switch for indicating the position of said pedal at which the throttle valve is opened to its fully open position, said respective switches being arranged along the moving track of said wiper within said accelerator position sensor and respectively issuing signals when said wiper crosses them, a first means connected to said accelerator position sensor and said respective switches, judging as a failure in case the output from said accelerator position sensor is not within a normal range previously memorized when a signal is generated by any of said respective switches and putting out a failure sensing signal, and a second means connected to said first means, judging a desirable running state on the basis of a combination of signals from said respective switches without accepting signals from said accelerator position sensor when said accelerator position sensor is judged to fail by said first means, and controlling an injector so that the desirable running state is obtained.

2. An electronically controlled internal combustion engine according to claim 1 further comprising a failure indicator for said accelerator position sensor connected to said first means and operated by failure sensing signals from said first means.

3. An electronically controlled internal combustion engine according to claim 1 further comprising a rotation sensor generating output signals corresponding to the number of revolutions of the engine and controlling said injector in consideration of the output from said rotation sensor.

* * * * *